United States Patent

Roth

[15] 3,699,256

[45] Oct. 17, 1972

[54] CIRCUIT FOR ACCURATELY DETECTING THE TIME OF OCCURRENCE OF A WAVEFORM

[72] Inventor: Stephen A. Roth, Beaverton, Oreg.

[73] Assignee: Tektronix, Inc., Beaverton, Oreg.

[22] Filed: Dec. 28, 1970

[21] Appl. No.: 101,732

[52] U.S. Cl. .........178/69.5 TV, 178/7.3 S, 328/139, 328/150

[51] Int. Cl. ..............................................H04n 5/04

[58] Field of Search ..........178/69.5 TV, 7.3 S, 7.5 S, 178/7.3 R, 7.5 R, 7.3 DC, 7.5 DC; 328/135, 139, 150

[56] References Cited

UNITED STATES PATENTS

| | | | |
|---|---|---|---|
| 2,632,049 | 3/1953 | Druz | 178/7.3 S |
| 2,828,356 | 3/1958 | Macovski | 178/7.3 S |
| 2,950,342 | 8/1960 | Revercomb | 178/7.3 S |
| 3,437,834 | 4/1969 | Schwartz | 307/235 |

*Primary Examiner*—Robert L. Richardson
*Attorney*—Buckhorn, Blore, Klarquist and Sparkman

[57] ABSTRACT

A circuit for accurately determining the time of occurrence of television synchronization pulses includes a means for establishing sync waveform tips at a first voltage value and means for controlling the amplitude of the video waveform so the blanking level achieves a second voltage value. The time of the synchronization pulse is then determined midway between these values. A pair of feedback loops are provided for substantially clamping the sync tips to the first value via a first low pass feedback circuit operating outside of the gain controlled system, and a high pass feedback circuit operating within a relatively fixed signal level environment.

10 Claims, 4 Drawing Figures

STEPHEN A. ROTH
*INVENTOR*

BY

*BUCKHORN, BLORE, KLARQUIST & SPARKMAN*
*ATTORNEYS*

PATENTED OCT 17 1972 3,699,256

SHEET 2 OF 2

STEPHEN A. ROTH
*INVENTOR*

BY

*BUCKHORN, BLORE, KLARQUIST & SPARKMAN*
*ATTORNEYS*

CIRCUIT FOR ACCURATELY DETECTING THE TIME OF OCCURRENCE OF A WAVEFORM

BACKGROUND OF THE INVENTION

Synchronization pulses may be detected in television receiving equipment relative to a carrier reference signal so the detection may take place at the proper level. However, in studio equipment and the like, the TV carrier is not present, but only the baseband or TV video is coupled from one instrument to another. Typically, the synchronization pulse tips are clamped at a given level and detected at a given voltage amplitude with respect thereto. This system operates well so long as the amplitude of the signal does not change. However, the video waveform may vary in amplitude and may also become degraded in various ways including by amplitude variation, loss of high frequency components, loss of low frequency components, addition of white noise, addition of impulse noise, and addition of mains frequency signals. As a result, synchronization can become inaccurate and may even be lost.

SUMMARY OF THE INVENTION

According to the present invention, the substantially exact time of a video synchronization signal is determined from the baseband or video signal without requiring a uniform input amplitude thereof. A first or tip amplitude of the signal is detected, and a value is added to the waveform until the tip is substantially clamped at a given voltage value. Circuit means detects a second signal level, this second level desirably comprising the blanking level of the video waveform. The amplifying means receiving the signal is controllably adjusted until the second level reaches a second voltage value. As a consequence, a third or intermediate value may be chosen for the detection of the synchronization on pulse waveform, e.g., at a voltage level half way between the two previous values, for always supplying a standard synchronization output relative to a substantially standardized point on the synchronization pulse.

In a preferred embodiment according to the present invention, means for adding a value to the input signal waveform, until the tip thereof corresponds to a given value, comprises high frequency and low frequency feedback circuits wherein the high frequency feedback loop operates "within" the low frequency feedback loop. Moreover, it is preferred the high frequency feedback loop be completed within the portion of the system wherein the amplitude of the signal waveform is controlled, while the low frequency feedback loop is completed outside the amplitude controlled portion of the system. The high frequency feedback loop may compensate for high frequency "tilt" components in the waveform sync pulses without interference from low frequency components such as "mains" or 60 cycle interference. The high frequency feedback loop is optimized within a fixed signal level environment wherein the "slew rate " for high frequency sync tilt problems can be adequately predetermined. Lower frequency interference is desirably removed prior to the amplification portion of the system, whereby the latter may be more adequately designed for providing the desired degree of amplification for the video signal.

Further in accordance with a preferred embodiment of the present invention, the circuit for detecting a predetermined level of a composite signal, and in particular the blanking level of a video waveform, comprises low pass filter means providing a given signal output when the video input is gated at a predetermined level. Feedback means controls the amplitude or positioning of the waveform until the level is adjusted relative to gating at the desired value level.

The circuit according to the present invention detects the synchronization pulse despite amplitude variations, loss of high frequency components, loss of low frequency components, addition of white noise, addition of impulse noise, and addition of "mains" frequency signals.

It is an object of the present invention to provide an improved circuit for accurately detecting the time of occurrence of an input waveform.

It is another object of the present invention to provide an improved circuit for detecting synchronization pulses in a television video signal.

It is a further object of the present invention to provide an improved circuit for accurately ascertaining the timing of television synchronization information without prior timing information.

It is another object of the present invention to provide a circuit for detecting the level of a signal based upon the duty cycle or waveform thereof.

It is a further object of the present invention to provide an improved circuit for removing waveform "tilt" from video synchronization pulses and the like.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
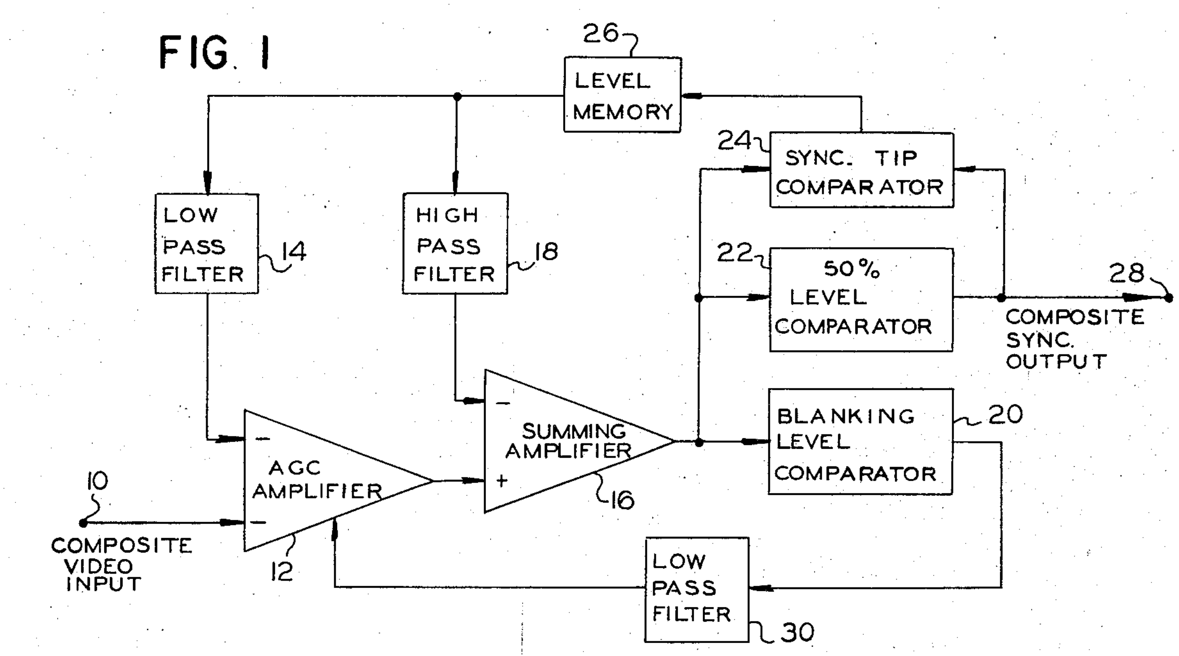
FIG. 1 is a block diagram of a circuit according to the present invention.

Referring to the drawings, and particularly to FIG. 1 thereof, a synchronization pulse detector according to the present invention includes an input terminal 10 connected to a first inverting input of an automatic gain controlled amplifier 12 deriving a second inverting input from a low pass filter 14. The output of amplifier 12 is applied to a non-inverting input of summing amplifier 16 which also receives an inverting input from high pass filter 18. The output of amplifier 16 is applied respectively to blanking level comparator 20, fifty percent level comparator 22, and sync tip comparator 24. Sync tip comparator 24 is provided with a level memory 26, the output of which is applied to the amplifiers 12 and 16, through filters 14 and 18, respectively. The output of 50 percent level comparator 22 is the sync output supplied according to the present circuit and which is delivered to output terminal 28 as well as to sync tip comparator 24, causing the latter circuit to respond during synchronization pulses. The output of blanking level comparator 20 is applied through low pass filter 30 as the gain control or A.G.C. of amplifier 12.

Figure 3:
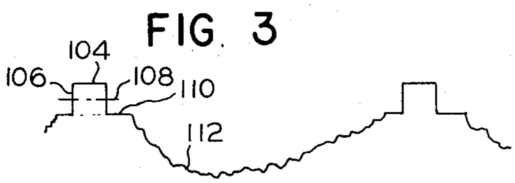
FIG. 3 is a waveform graph of a composite television video or baseband signal.

Considering operation of the FIG. 1 circuit, a composite video signal is applied at terminal 10 in an inverted or negative-going sense, which, after subsequent inversion by amplifier 16, would appear somewhat as illustrated in FIG. 3. The FIG. 3 signal includes horizontal sync pulse 106. The horizontal sync pulse rises above a blanking level 110 to sync tip 104. The video information 112, representing the horizontal scan of picture information, appears between blanking levels.

It is desired, according to the present invention, to provide a synchronizing output at terminal 28 when the horizontal sync pulse 106 reaches a level approximately half way between level 110 and tip 104, i.e., where horizontal line 108 intersects the leading edge of sync pulse 106. For this purpose, the sync pulse is first standardized between the two extreme levels.

The sync tip level is substantially clamped by means of a sync tip comparator 24 which detects tip 104 and provides feedback via level memory 26 and filters 14 and 18 for repositioning the composite video input until sync tip 104 corresponds with a preselected voltage. Thus, the outputs of filters 14 and 18 are added to amplifiers 12 and 16, respectively, until the sync tips are positioned at, or substantially clamped to, a given voltage. Moreover, the feedback circuits thus provided, and particularly the one including high pass filter 18, remove "tilt" from the sync tips 104. Thus, the sync tips may actually tend to be other than horizontal on top, as viewed on an input waveform representation. The waveform position is adjusted via the feedback circuits during the detection of level 104 such that level 104 is substantially flat or at a constant voltage value.

The proper feedback level is substantially remembered between sync tips by level memory 26. Level memory 26 operates during the synchronization pulse 106 for providing optimum response to tilt problems and the like. However, level memory 26 tends to retain a given value from one sync pulse 106 until the following such sync pulse, causing the entire waveform to be referenced to the sync tip level at substantially all times.

The blanking level 110 is set at a selected voltage value employing blanking level comparator 20 driving low pass filter 30 which provides A.G.C. feedback for amplifier 12. The blanking level comparator ascertains the blanking level, without timing information, on a duty cycle basis, as hereinafter more fully set forth. Since the output of the circuit is the timing of a particular sync pulse, it is desirable for the circuits of the present invention to ascertain the desired information without themselves requiring timing information. The differences between sync pulse width, blanking signal width, and the width of the general signal are utilized to determine the blanking level. If the blanking level in the output of summing level 16 is above a predetermined voltage value, blanking level comparator 20 operates via low pass filter 30 for increasing the gain of amplifier 12 so that the blanking level becomes further removed from the sync tip. If, on the other hand, the blanking level at the output of summing amplifier 16 is below a desired voltage value, blanking level comparator operates via low pass filter 30 for decreasing the gain of amplifier 12 until the blanking level attains the proper voltage value. The system functions with no timing information being required to close the automatic gain control loop.

Thus, the sync tip 106 appearing at the output of summing amplifier 16 will have a predetermined maximum voltage value and a predetermined minimum voltage value regardless of the actual original amplitude of the signal provided at terminal 10. Fifth percent level comparator 22 is set for operating at a level for detecting the pulse substantially half way between the levels at which comparators 20 and 24 are operable. Consequently, an output is provided at terminal 28 which is representative of the proper sync timing despite the presence of noise, signal waveform degradation, etc. While the fifty percent level is desirable for optimum immunity from noise, it is clearly evident that some other particular voltage value may be selected between the extreme levels of the sync pulse waveform.

It is noted the feedback path including high pass filter 18 and amplifier 16 is "inside" the feedback path including low pass filter 14 and amplifier 12. The last mentioned feedback path is principally efficacious in establishing the general sync level for maintaining the DC level of the entire waveform in FIG. 3 relative to the sync tips. The output of low pass filter 14 is added to the composite video input until the waveform is maintained at such level. Slow "tilt" information, for correcting the slope of tip 104 is coupled via low pass filter 14. For example, slow 60 cycle "mains" stray signals are eliminated in this manner. However, the loop including high pass filter 18 corrects the high frequency error components which are represented by individual tilts and the like on sync tips. The latter feedback circuit, including high pass filter 18, operates in a fixed signal level environment, being within the gain controlled portion of the system. This allows optimization of the circuit 24 "slew rate" for fairly high frequency sync tilt problems with no consideration for the incoming overall signal level.

Since the low frequency components are fed back via low pass filter 14 outside the gain controlled portion of the system, stray "mains" (e.g., 60 cycle) frequency signals are largely eliminated before passing through amplifiers 12 and 16. The system can consequently reject a very large amount of "mains" frequency interference while simultaneously being responsive to a small video signal. The signal via the feedback path including low pass filter 14 provides an "anticipatory" effect on the positioning of the sync tips relative to undesired tilt. The "anticipation" causes the proper sync level clamping nearly to be achieved even at a time just before the next sync tip is received.

Elimination of both low and high frequency components of tilt in the video signal is, of course, desirable since it further enables the relatively exact detection of a particular desired point on the sync signal, e.g., the 50 percent point, eliminating undesirable jitter and the like.

Figure 4:
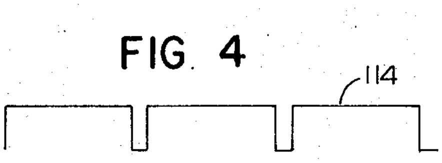
FIG. 4 is a graph of a television vertical synchronizing signal.

Although the operation has been described with particular reference to the elimination of tilt on the horizontal sync tips 104, it will be appreciated that the circuit is also efficacious to standardize the top level of the vertical synchronization signal as indicated at 114 in FIG. 4. Because of the longer duration of the vertical synchronization information, undesired tilt thereof can be an even greater problem than in the case of the horizontal synchronization pulse. This problem is also alleviated by the present invention.

Figure 2:
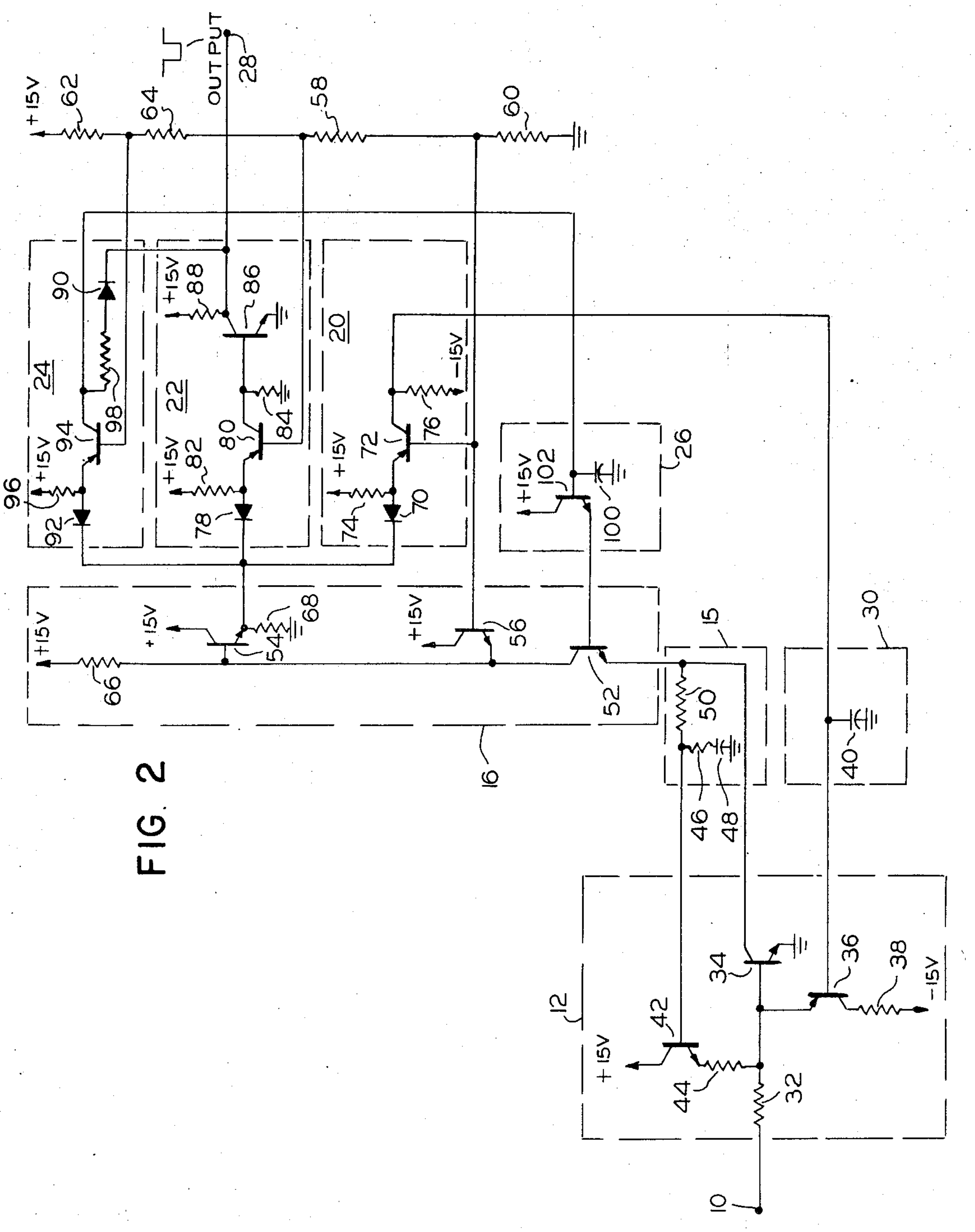
FIG. 2 is a schematic diagram of the FIG. 1 circuit.

Referring to FIG. 2, illustrating the FIG. 1 circuit in greater detail, the portions of the circuit within dashed lines correspond to blocks in FIG. 1 having the same reference numerals applied thereto. A.G.C. amplifier 12 includes an input coupling resistor 32 disposed between input terminal 10 and NPN transistor 34, the latter having its emitter grounded. The collector of transistor 34 is coupled to provide an input for summing amplifier 16. The base of transistor 34 is further connected to the emitter of PNP transistor 36 having its collector returned to a negative voltage via resistor 38 and its base coupled to the ungrounded terminal of capacitor 40, here comprising the principal component of low pass filter 30. An A.G.C. control signal is received at the base of transistor 36 corresponding to the charge across capacitor 40.

An NPN transistor 42 has its collector connected to a positive voltage and its emitter coupled to the base of transistor 34 by way of resistor 44. The base of transistor 42 receives the remaining input provided amplifier 12 from filter circuit 15. Filter circuit 15 in FIG. 3 corresponds in function to both filters 14 and 18 in FIG. 1, and operates in a manner hereinafter more fully described. Filter 15 includes a series combination of resistor 46 and a capacitor 48 disposed between the base of transistor 42 and ground, and further includes a resistor 50 interposed between the collector of transistor 34 and the base of transistor 42.

Summing amplifier 16 receives its non-inverting input at the emitter of NPN transistor 52 connected to the junction between resistor 50 and the collector of transistor 34. The inverting input for amplifier 16 is applied to the base of transistor 52 from level memory 26, while the collector of transistor 52 is coupled via load resistor 66 to a positive voltage. Amplifier 16 further includes an output NPN transistor 54 and a limiting NPN transistor 56. The collector of transistor 56 is connected to a positive voltage and its emitter is connected to the collector of transistor 52. The base of transistor 56 is connected to a positive voltage above ground at a tap between resistors 58 and 60, these resistors forming a series voltage divider between a positive voltage and ground together with resistors 62 and 64. The base of transistor 54 is connected to the collector of transistor 52. The collector of transistor 54 is provided with a positive voltage, while its emitter is returned to ground by means of resistor 68. The emitter of transistor 68 provides the output of amplifier 16 and is applied as the input of comparators 20, 22, and 24.

Comparator 20 includes a diode 70 having its cathode connected to the emitter of transistor 68 and its anode connected to the emitter of a PNP transistor 72. The latter junction is coupled to a positive voltage through resistor 74. A load resistor 76 is disposed between a negative voltage and the collector of transistor 72 where an output is provided for connection to the ungrounded terminal of capacitor 40. The base of transistor 72 is connected to the tap on the voltage divider between resistors 58 and 60 of the voltage divider, the latter providing a comparison reference for the circuit.

The comparator 20 operates in the following manner. If the cathode of diode 70 is sufficiently negative relative to its anode, current from resistor 74 flows through this diode rather than through the emitter of transistor 72. As the voltage at the cathode of diode 70 becomes more positive, a point will be reached wherein the current from resistor 74 divides between diode 70 and the emitter of transistor 72. Of course, as the cathode of diode 70 rises above the latter value, more of the current from resistor 74 will be coupled through the transistor. The voltage at which the transition takes place, or the level at which the current equally divides between diode 70 and transistor 72, is set by the base voltage of transistor 72. Assuming the same diode drop exists across diode 70 and across the emitter-base junction of transistor 72, equal current will flow through the junctions when the cathode voltage of diode 70 is equal to the voltage provided at the base of transistor 72. As more current passes through transistor 72, developing a greater voltage drop across resistor 76, the charge across capacitor 40 will increase.

Comparator 22 similarly comprises a diode 78 having its cathode connected to the emitter of transistor 54 and its anode connected to the emitter of PNP transistor 80, the last mentioned junction being returned to a positive voltage through resistor 82. The base of transistor 80 is connected to a voltage reference point between voltage divider resistors 58 and 64, while a resistor 84 is interposed between the collector of transistor 80 and ground. The collector of transistor 80 is also coupled to the base of an output NPN transistor 86, the emitter of which is grounded and wherein a load resistor 88 is disposed between the transistor's collector and a positive voltage. The collector of transistor 86 supplies the circuit output and is accordingly connected to output terminal 28 as well as to the cathode of diode 90 in comparator 24. Comparator 22 operates in a manner similar to comparator 20 and supplies a negative-going output when a positive-going input at the cathode of diode 78 passes the predetermined positive level set at the junction between resistors 58 and 64.

Comparator 24 comprises an input diode 92 having its cathode connected to the emitter of transistor 54 and its anode connected to the emitter of PNP transistor 94 wherein such emitter is also returned to a positive voltage through resistor 96. The base of transistor 94 is connected to a reference voltage at a tap between resistor 62 and resistor 64 of the voltage divider, while the collector of transistor 94 is coupled to the anode of diode 90 by way of resistor 98. The collector of transistor 94 is also coupled to the ungrounded terminal of a capacitor 100 forming a part of level memory 26. Comparator 24 operators in a manner similar to that hereinbefore described for comparator 20, and provides a positive-going output at its collector when the input at the cathode of diode 92 exceeds a voltage level set at the tap between resistors 62 and 64. The positive voltage output charges capacitor 100 in level memory 26, the latter providing the input at the base of PNP transistor 102. The collector of transistor 102 is connected to a positive voltage, while its emitter is connected to the base of transistor 52 for supplying the inverting input of amplifier 16.

Considering detailed operation of the FIG. 2 circuit, the input at terminal 10, in the form of a video waveform, produces an inverted output at the collector of transistor 34. This same signal is coupled through transistor 52 and transistor 54, appearing at the emitter of transistor 54. As the level of the composite waveform increases, the comparison level of comparators 20, 22, and 24 will be successively reached during normal operation of the circuit, whereby these comparators successively provide a change in output level. Thus, at the tips 104 of the composite video waveform as illustrated in FIG. 3, current will be diverted from resistor 96 through transistor 94 for charging capacitor 100 to such level. As hereinbefore described in connection with FIG. 1, this level is applied back to the summing amplifier 16 completing a feedback loop. The action of the high pass filter 18, as described in connection with FIG. 1, is provided by means of circuit 15 wherein capacitor 48 couples the emitter of transistor 52 to ground via resistors 46 and 50 for predetermined higher frequency values. Therefore, the higher frequency components of the instantaneous sync tip voltage appear at the collector of transistor 52, it being understood that capacitor 100 is capable of following these changes to the extent desired when thus driven. The high frequency sync tip correction is achieved in a substantially fixed signal environment as hereinbefore mentioned, and the degree of correction desired is not affected by the amplitude of a 60 cycle component or the like which might also be present at the input.

The capacitor 48 provides appreciable emitter degeneration in the circuit for lower frequency components. The voltage across the series combination of resistor 46 and capacitor 48 representative of the lower frequency components is, however, applied to the base of transistor 42 for providing the function of low pass filter 14 in FIG. 1. These lower frequency components are coupled via resistor 44 to the base of transistor 34 for combining with the input signal prior to transistor 34, which is gain controlled via transistor 36 in a manner hereinafter more fully described. The lower frequency components principally set the sync tip level, and at the same time are operative to correct lower frequency sync tip tilt problems, having principally an "anticipatory"effect. Sixty cycle interference and the like is removed prior to transistor 36 allowing the latter, and the rest of the circuit, to have maximum effectiveness with respect to the video signal without this interference.

The input to transistor 102 changes with the value at the waveform tip so long as comparator 24 continues to operate, that is, for the duration of the sync pulse. At the conclusion of the sync pulse, when the waveform from amplifier 16 drops past the comparison level of comparators 24 and 22, the collector of transistor 86 is positive-going, cutting off diode 90. Since a transistor 94 is also nonconducting, the charge on capacitor 100 can change only slowly and the level thereon will be substantially remembered until the time of the ensuing sync pulse. Thus, only during the presence of a sync pulse is capacitor 100 provided with a substantial discharge path.

The output of the circuit comparator 22 is employed for "gating" operation of comparator 24 and memory 26, the level to which comparator 22 is responsive being below the level to which comparator 24 is responsive. The lower level of comparator 22 accurately insures the instantaneous value of the sync pulse amplitude is transmitted for the entire duration of the sync pulse but substantially no longer. Proper operation of comparator 24 and memory 26 is thereby assured wherein the output at the emitter of transistor 102 correctly follows the instantaneous value of the sync pulse for the entire duration thereof, with the last level reached being remembered until the next sync pulse.

Through the action of transistor 52, completing a feedback loop, the entire waveform is moved upwardly or downwardly in such manner that the sync tip level (104 in FIG. 3) corresponds to the voltage value on the voltage divider between resistors 62 and 64. As also hereinbefore mentioned, the level 114 of the vertical sync is of equal or greater interest in re establishing a predetermined value therefor. Limiting transistor 56 will remove the video information 112 which is not of interest in the present circuit.

Comparator 24 is not only "self-gated" by the output signal, but is also rate limited. It is thus desired the sync tip level be followed and "squared up" to a particular voltage level, without at the same time registering undesired response to noise. Thus, resistor 96 is of such a value relative to capacitor 100 to cause the response of the circuit to be fast enough for following and correcting the usual high frequency components of tilt, without at the same time being responsive to higher frequency noise components. Capacitor 100 averages the white noise on the sync tip, during the time transistor 94 conducts, for determining the true sync tip level and adjusts the waveform with respect thereto via transistors 102 and 52. Insufficient current is provided by resistor 96 for following fast noise impulses and the like. This rate limiting also allows the circuit to be "self-gated" in the sense that it is gated by the output signal from comparator 22 as hereinbefore described. The rate limiting allows the feedback loop to open at the trailing end of a sync pulse because the limited current from resistor 96 does not allow comparator 24 to attempt to follow the sync pulse edge. The response of the circuit can be optimized relative to a tradeoff between tilt-responsiveness, and noise-non-responsiveness in regard to a fixed amplitude signal having low frequency (e.g., supply line) components substantially removed prior to amplifier transistor 36, as hereinbefore mentioned.

Considering operation of comparator 20, diode 70 is arranged to share the current from resistor 74 with the emitter of transistor 72 as the video signal reaches the blanking level, 110, in FIG. 3. Transistor 72, when conducting, provides current to capacitor 40, and resistor 76 provides a discharge path for capacitor 40. As hereinbefore mentioned, capacitor 40 provides the function of a low pass filter 30 and averages its charging current over an appreciable number of cycles of the synchronization signal. The capacitor 40 provides a predetermined output level for a given duration of input, i.e., for a given period during which current is supplied via transistor 72. The resultant voltage value across capacitor 40 is provided via the feedback path coupled to the base of transistor 36 for controlling the gain of amplifier 12, which, of course, affects the entire level of the output of amplifier 12. As the charge on capacitor 40 increases, transistor 36 conducts to a lesser extent, resulting in increased gain for the amplifier. If the charge on capacitor 40 drops, transistor 36 conducts to a greater extent, and shunts some of the signal current away from transistor 34, thereby reducing the gain of amplifier 12. The circuit values are selected such that if transistor 72 conducts only for the duration of synchronization pulse 106 in FIG. 3, the charge on capacitor 40 will be reduced to the extent that level 110 in effect rises at the input of comparator 20, it being remembered that level 104 is controlled to correspond to a higher definite voltage. Now, if this gain reduction increases to the point where transistor 72 conducts for a longer period than provided by blanking level 110, i.e., down into the video information in FIG. 3, capacitor 40 will be charged to a level increasing the gain of amplifier 12, until the division of current between diode 70 and transistor 72 takes place with blanking level 110 equal in voltage to the voltage on the base of transistor 72. The voltage of blanking level 110 is preset in voltage entirely on the basis of the duty cycle or waveform of the input signal, and no timing information is employed first to locate or then to clamp this level. It is seen this voltage of level 110 also corresponds approximately to the limiting level set by transistor 56. The circuit is in normal operating condition when level 104 corresponds to the voltage at the tap between resistors 62 and 64, and the blanking level corresponds to the voltage at the tap between resistors 58 and 60.

As hereinbefore stated, the charge on capacitor 40 is relatively slowly changing. Since the input waveform contains vertical as well as horizontal synchronizing information, and the blanking level is determined on the basis of the horizontal synchronizing waveform, the time constant of the circuit including capacitor 40 averages the output from comparator 20 over several frames.

The level at which current from resistor 82 divides between diode 78 and transistor 80 is desirably selected so that an output is provided at terminal 28 as the waveform reaches a point approximately half way up the sync pulse, e.g., at level 108 in FIG. 3. This level is selected for optimum immunity from noise, and from waveform rise time degradation, etc. The circuit will always select this level, corresponding to the voltage at the tap between resistors 58, and 64, for uniformly producing an output at accurately predetermined times substantially corresponding to the intended exact time of occurrence of the horizontal synchronization pulse.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A circuit for accurately detecting the time of occurrence of a waveform comprising:
 first means for detecting a first amplitude level of said waveform,
 second means for detecting a second amplitude level of said waveform,
 amplifying means for receiving said waveform and for varying the amplitude of said waveform under the control of the first means for detecting a first level of said waveform, for changing the first level of said waveform until such level as detected corresponds to a first predetermined value,
 and means for detecting a third level of said waveform between the first and second levels to establish the time of occurrence of said waveform.

2. The circuit according to claim 1 further including means, under the control of the second means for detecting a second level of said waveform, for adding a value to said waveform until the second level thereof corresponds to a second predetermined value, said third level detecting means detecting a third level of said waveform between said first and second values.

3. A circuit for detecting synchronization pulses of a television video signal waveform comprising:
 means for detecting the tips of synchronization pulses in said video waveform and means responsive thereto for adding a value to the video waveform for causing said tips of said synchronization pulses to assume a first predetermined level,
 second means for detecting the blanking level of said video waveform,
 amplifier means for said video waveform responsive to said means for detecting the blanking level for changing the amplitude of said video waveform until the blanking level corresponds to a second predetermined level,
 and means responsive to an intermediate level of said video waveform between said first and second predetermined levels for providing a synchronization pulse output.

4. The apparatus according to claim 3 wherein said means for causing said synchronization tips to assume a first predetermined level includes a first feedback loop including low pass filter means for adding a value to said video waveform,
 and a second feedback loop, including high pass filter means, inside said first feedback loop for adding a value to said video waveform.

5. The circuit according to claim 3 wherein said means for causing said synchronization tips to assume a first predetermined level comprises a first feedback circuit including low pass filter means for adding a value to said video waveform before amplification thereof by said amplifier means,
 and second feedback means including high pass filter means for adding a value to said video waveform after amplification thereof by said amplifier means.

6. The circuit according to claim 5 wherein said second feedback means is responsive to high frequency waveform tilt components while being rate-limited for rendering it relatively unresponsive to noise components.

7. The circuit according to claim 3 wherein said means for detecting the tips of synchronization pulses in said video waveform includes means responsive to the variations in said waveform substantially for the duration of synchronization pulses, and means for remembering the last value reached.

8. The circuit according to claim 7 wherein said means responsive to the variations in said waveform substantially during the duration of synchronization pulses comprises a comparator operative during said synchronization pulses as the same reach a predetermined value and wherein said means for remembering comprises capacitor means for receiving current in response to operation of said comparator when said synchronization pulses reach said predetermined value.

9. The circuit according to claim 3 wherein said second means for detecting the blanking level comprises:

first means responsive to the duty cycle of the television video waveform including means for receiving said video waveform as an input and including means for providing a predetermined output for a given duration of input corresponding to the blanking level of the video waveform, a feedback circuit, responsive to said duty cycle responsive means, for affecting the level of the video waveform relative to the duty cycle responsive means, and a gating circuit between said feedback circuit and said duty cycle responsive means for coupling the video waveform to the duty cycle responsive means as the video waveform reaches a predetermined value.

10. The circuit according to claim 9 including means responsive to said video waveform failing to reach an intermediate level for decoupling a discharge path from said capacitor means.

* * * * *